Patented Jan. 9, 1923.

1,441,696

UNITED STATES PATENT OFFICE.

CLAUDE P. McNEIL, OF NEW YORK, N. Y., AND EUGENE P. BROWN, OF WHITING, INDIANA.

ABSORBENT FOR GASES.

No Drawing.　　Application filed May 2, 1919. Serial No. 294,355.

*To all whom it may concern:*

Be it known that we, CLAUDE P. MCNEIL and EUGENE P. BROWN, citizens of the United States, and residing at New York, N. Y., and Whiting, Indiana, respectively, have invented certain new and useful Improvements in Absorbents for Gases, of which the following is a specification.

This invention relates to absorbents for gases of the well-known soda-lime type. Such absorbents have proven rather unsatisfactory by reason of a lack of hardness and durability under various conditions. To overcome this difficulty, it has been attempted to incorporate Portland cement into the mixture, but an absorbent containing such cement has been found to be relatively soft, has an inferior activity towards the absorption of gases, is not porous, and the cement constitutes a dead weight within the absorbent.

The present invention contemplates the omission of cement and obviates the disadvantages of prior mixtures, it being among the objects of this invention to produce an absorbent which is hard, porous, permanent, non-deliquescent, having high activity and capacity, preferably alkaline, and capable of use as an absorbent for gases or vapors. In carrying the objects of this invention into effect, we provide a composition having properties peculiarly adapting the material to efficient absorption of poisonous and other gases or vapors.

Specific examples of poisonous and noxious gases or vapors for which these absorbents have been found suitable are chlorinated organic compounds, such as chlorpicrin and phosgene; reducing compounds, such as arsine; acid compounds, such as hydrochloric acid; and certain more or less stable compounds, such as water vapor, $CO_2$ gas and some hydrocarbon vapors. The absorbent is specially fitted for purifying air to be breathed by men or other animals and if used in canisters in connection with gas masks will afford protection against certain toxic war gases, examples of which have been heretofore enumerated. Another use for this absorbent is in the recovery of vapors or liquids of low boiling point, such as the low boiling hydrocarbons, which are otherwise lost in the industries.

Our absorbent may be varied considerably in composition but usually includes alkaline material such as hydrated lime, magnesia, sodium hydroxide or potassium hydroxide or mixtures of two or more of these. For porosity, we use aluminous or silicious material such as kieselguhr, diatomaceous earth, infusorial earth, silicious sinter, pumice or volcanic dust. Finely divided active absorbent carbon is generally added on account of its high efficiency in the adsorption of gases and the porosity which it lends to the completed absorbent.

The activated absorbent carbon may be produced by heating carbon, such as coal, charcoal, etc., in the presence of mild oxidizing agents such as air, steam, $CO_2$, etc., at temperatures above 700° C. for several hours. If air is used as the oxidizing agent, lower temperatures may be employed and the heating is continued for a shorter time than when steam or $CO_2$ is employed. After heating, the activated carbon is then ground and is ready for incorporation with the other ingredients entering into our product.

The hardness of our finished product is obtained in a variety of ways: by the hydration of one or more of the components as the hardening of certain self-cementitious hydraulites such as calcium aluminates which may be added to or formed in the absorbent; by the crystallization of one or more constituents which causes hardening due to the interlocking of crystals which develop within the material; or by the formation of silicates, aluminates or alumina-silicates or similar substances, which takes place when material containing acidic and basic components as above mentioned are mixed. These substances not only render the absorbent harder but tend to increase the activity.

A process of preparation of the absorbent which we have found to give good results is as follows: The dry materials are thoroughly mixed in the dry state and are charged along with the soluble materials in solution into a mixer of any well known type and mixing is continued until the wet mixture is uniform in composition. The mixture is immediately dumped on trays where it is spread out to an approximately uniform thickness. The trays have heavy iron wire cloth bottoms of large mesh so that the elimination of water in setting takes place from the lower as well as the upper surface. After slabbing, the trays are placed in open rooms which are kept at normal temperature until initial hardness sets in, which occurs in one to ten days, usually in about two days. The drying of the cake to the desired moisture content is carried out under vacuum or under atmospheric pressure at temperatures less than 125° C. until the moisture content is between 3 and 20%. The dried cakes are then broken up into lumps or ground and sized as desired, and the material is stored in moisture-proof drums to protect it from the atmosphere.

The essential composition of the absorbent contemplated by our invention may vary within the following limits:

| | Per cent. |
|---|---|
| Alkaline earth hydrate, such as hydrated lime | 10 to 87 |
| Caustic alkali, such as caustic soda | 0 to 6 |
| Silicious material, such as kieselguhr | 5 to 25 |
| Active absorbent carbon | 0 to 75 |
| Moisture | 3 to 20 |

We may omit one or more of the constituents, but preferably we use the combination of materials above set forth. It is desirable that some easily soluble form of silica such as occurs in amorphous form, e. g., kieselguhr, diatomaceous earth, pumice or volcanic dust or finely divided silicious sinter and some soluble form of alumina such as precipitated aluminum hydroxide or hydrated alumina be present so that the system may be provided with these components which have an important bearing on the development of the hardness of the finished product.

We do not intend to limit ourselves to the specific combination of materials described nor to the exact proportions of the constituents of our absorbent, except as limited by the following claims:

We claim as our invention:

1. A hard, porous, non-deliquescent absorbent having high activity and capacity comprising the reaction products of basic material, silicious material and activated carbon.

2. A hard, porous, non-deliquescent absorbent having high activity and capacity comprising the reaction products of alkaline earth hydrate, caustic alkali, silicious material and activated carbon.

3. A hard, porous, non-deliquescent absorbent having high activity and capacity comprising the reaction products of hydrated lime, caustic soda, kieselguhr and activated carbon.

4. A hard, porous, non-deliquescent absorbent having high activity and capacity and an alkaline reaction comprising the reaction products of basic material, silicious material and activated carbon.

5. A hard, porous, non-deliquescent absorbent having high activity and capacity and an alkaline reaction comprising the reaction products of alkaline earth hydrate, caustic alkali, silicious material and activated carbon.

6. A hard, porous, non-deliquescent absorbent having high activity and capacity and an alkaline reaction comprising the reaction products of hydrated lime, caustic soda, kieselguhr and activated carbon.

7. A hard, porous, non-deliquescent absorbent having high activity and capacity comprising the reaction products of alumino-silicate and activated carbon.

8. A hard, porous, non-deliquescent absorbent having high activity and capacity and an alkaline reaction comprising the reaction products of alumino-silicate and activated carbon.

9. A hard, porous, non-deliquescent, absorbent having high activity and capacity comprising the reaction products of alkaline earth hydrate, caustic alkali, silicious material, activated carbon and moisture, in the proportions described.

CLAUDE P. McNEIL.
EUGENE P. BROWN.